(12) United States Patent
Larsen

(10) Patent No.: US 7,924,266 B2
(45) Date of Patent: Apr. 12, 2011

(54) STAND ALONE MODULE MOUSE WITH REPLACEABLE COVER

(75) Inventor: Glen Larsen, Bisaqua, WA (US)

(73) Assignee: Microsoft Corporation, Redmond, WA (US)

( * ) Notice: Subject to any disclaimer, the term of this patent is extended or adjusted under 35 U.S.C. 154(b) by 861 days.

(21) Appl. No.: 11/697,821

(22) Filed: Apr. 9, 2007

(65) Prior Publication Data

US 2008/0246727 A1 Oct. 9, 2008

(51) Int. Cl.
*G06F 3/033* (2006.01)
(52) U.S. Cl. ............................................ 345/163
(58) Field of Classification Search .................. 345/156, 345/163, 157; 463/37; 715/700, 701, 702; 200/333
See application file for complete search history.

(56) References Cited

U.S. PATENT DOCUMENTS

| | | | |
|---|---|---|---|
| 5,894,302 A | 4/1999 | Scenna et al. | 345/163 |
| 6,031,522 A * | 2/2000 | Strand | 345/163 |
| 6,256,015 B1 * | 7/2001 | Adler | 345/163 |
| 6,396,478 B1 | 5/2002 | Kravtin et al. | 345/163 |
| 6,714,188 B1 | 3/2004 | Zebuhr et al. | 345/163 |
| 6,922,186 B2 | 7/2005 | Whitcomb | 345/163 |
| 7,016,185 B2 | 3/2006 | Chen et al. | 361/683 |
| 7,295,186 B2 * | 11/2007 | Brosnan | 345/166 |
| 7,598,711 B2 * | 10/2009 | Krah et al. | 320/140 |
| 7,633,486 B2 * | 12/2009 | Lai et al. | 345/156 |
| 2004/0080493 A1 | 4/2004 | Kenin | 345/163 |
| 2005/0174330 A1 | 8/2005 | Varga | 345/163 |
| 2006/0007152 A1 | 1/2006 | Wang | 345/163 |
| 2006/0187206 A1 | 8/2006 | Jing | 345/163 |

OTHER PUBLICATIONS

"Mouse Pointing Device Package Design", http://www.cyberhand.com/products.htm.
Francis K.H. Quek et al., "FingerMouse: A Freehand Pointing Interface", (VISLab) Electrical Engineering and Computer Science Department, Chicago, IL. (1995).

* cited by examiner

*Primary Examiner* — Abbas Abdulselam
(74) *Attorney, Agent, or Firm* — Christopher J. Volkmann; Westman, Champlin & Kelly, P.A.

(57) ABSTRACT

A computer mouse includes two components. A fully functional module mouse and a shell mouse that fits over the module mouse. The module mouse is configured to perform at least one complete mouse function, independently of the shell mouse. Other functions can be split between the shell mouse and the module mouse, in any desired way.

20 Claims, 7 Drawing Sheets

STAND ALONE MODULE MOUSE WITH REPLACEABLE COVER

BACKGROUND

One of the most common computer user input devices in use today is the computer mouse. There is continuing research in the areas of ergonomics, in order to determine the best overall physical conformation (the best overall shape of the exterior surfaces) of a computer mouse. In addition, regardless of ergonomics, user preferences change. Manufacturers of computer mice often desire to build and sell mice that users want. Therefore, the overall physical conformation of a computer mouse which a manufacturer desires to produce can change with user preferences.

Currently, when a mouse with a new physical conformation is developed, this usually requires a complete redesign of the layout of the physical components of the mouse (such as buttons, scroll wheels, optics, etc.) as well as the circuitry within the mouse. For instance, the physical layout of optical navigation elements must be redesigned each time the overall outer conformation of the mouse is redesigned. The optical navigation elements often include a light source, a camera, and optics (such as lenses, light pipes, etc.). Such a redesign of the physical layout of the optical navigation elements requires the new physical layout to be re-tested, tolerances to be determined, and optimization to be performed, each time the redesign is done. These new designs thus require external testing, specification development and quality control methods.

Some current mouse design approaches have attempted to develop a platform around which new mouse designs can be based, without changing certain portions of the original mouse design. However, these prior platform approaches have primarily involved consolidating printed circuit board components, within the mouse, such that a new mouse may not need a completely new printed circuit board assembly. However, these types of approaches have been quite restrictive.

For instance, the end result of using a printed circuit board assembly as a platform is a requirement that the printed circuit board must be mounted, within the mouse, in a given fashion. This has resulted in a common mouse bottom case (the base surface of the mouse that engages the work surface over which the mouse travels) which, itself, requires a fixed bottom case footprint that restricts industrial design. If the bottom case footprint is fixed, there is relatively little design freedom. Alternatively, if only the printed circuit board assembly is fixed, then there can be relatively few manufacturing volume efficiencies derived that result in cost advantages. For these reasons, there have been very few printed circuit board assembly platforms that have been implemented for mouse designs in the industry. They are fairly restrictive, and they simply do not yield significant cost advantages.

The discussion above is merely provided for general background information and is not intended to be used as an aid in determining the scope of the claimed subject matter.

SUMMARY

In one embodiment, computer mouse includes two components. A fully functional module mouse and a shell mouse that fits over the module mouse. The module mouse is configured to perform at least one complete mouse function, independently of the shell mouse. Other functions can be split between the shell mouse and the module mouse, in any desired way.

The invention can be extended such that the module mouse is removably connected to the shell mouse such that it can be disconnected, and used by itself, by a user. Similarly, in that embodiment, a plurality of different shell mice are interchangeably connectable to the module mouse by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
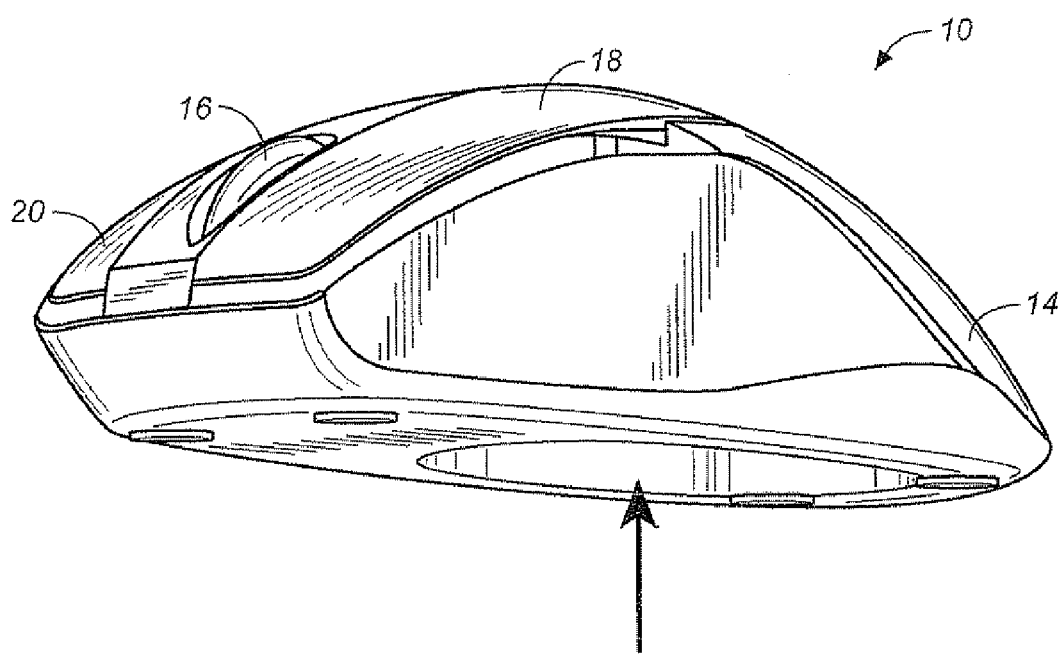
FIG. 1A is an illustration of a module mouse and a shell mouse, separate from one another, in accordance with one embodiment.

FIG. 1A shows an embodiment of a mouse assembly 10 that includes a fully functional module mouse 12 and a shell mouse 14. In the embodiment shown in FIG. 1A, module mouse 12 is a very small, fully functional, stand alone mouse, that performs one or more mouse functions, by itself. Module mouse 12 may, for example, have an overall length of approximately an inch, such that it can be easily moved across a work surface by a user, with one finger. Of course, this measurement is exemplary only, and the measurement is not critical to the present invention. Any other desired dimensions could be used, and the one inch measurement is simply given for purposes of example.

FIG. 1A shows that module mouse 12 can be inserted within shell mouse 14. In the embodiment shown in FIG. 1A, shell mouse 14 is a full size mouse cover. Module mouse 12 is illustratively inserted and secured within shell mouse 14, and the user, by actuating user input elements on shell mouse 14, can perform any desired mouse functions.

Figure 1B:
FIG. 1B shows the shell mouse and module mouse of FIG. 1A connected to one another.
Figure 1B:
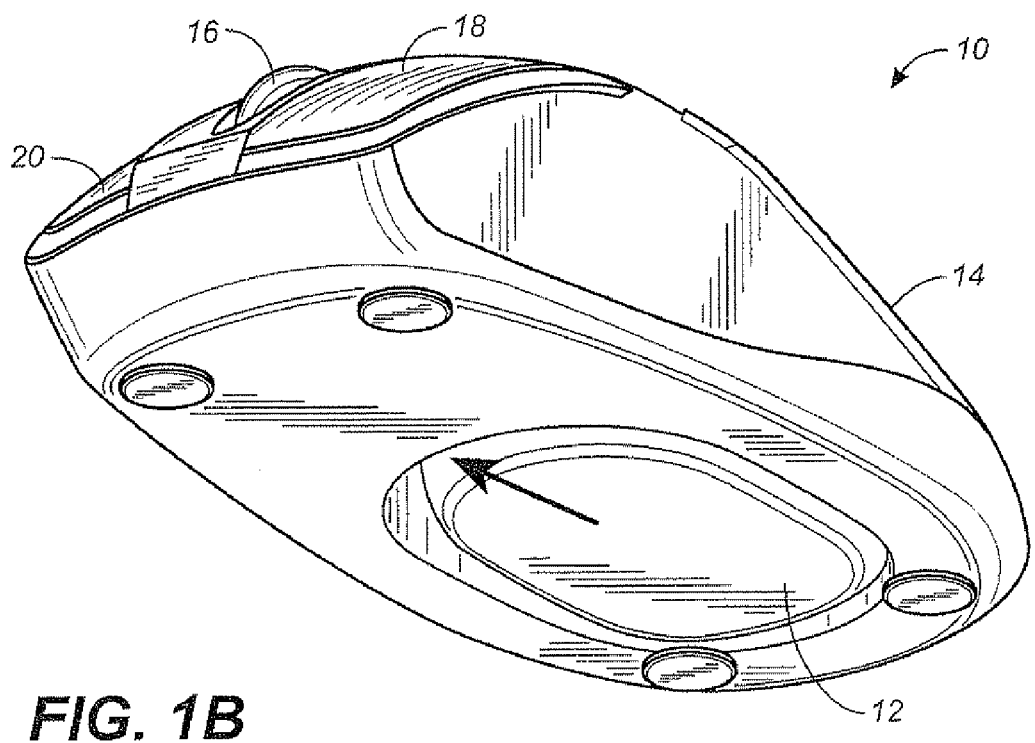

FIG. 1B shows one embodiment of module mouse 12 docked within shell mouse 14. In the embodiment shown in FIG. 1B, module mouse 12 is connected to shell mouse 14 with both a mechanical connection, which holds module mouse 12 physically within shell mouse 14, and signal connections. The signal connections can be any type of connection that transfers a user input from shell mouse 14 to module mouse 12. For instance, shell mouse 14 is shown with a wheel 16 and two mouse buttons 18 and 20. In one embodiment, the signal connections form a physical, mechanical connection, between wheel 16 and buttons 18 and 20 and corresponding elements on module mouse 12. Therefore, when the user depresses button 20 on the shell mouse 14, for instance, a mechanical plunger is arranged such that it depresses a corresponding button on mouse 12. Similarly, when the user rolls wheel 16 on shell mouse 14, a physical drive train can be used to rotate a corresponding wheel on module mouse 12.

Of course, the signal connections between module mouse 12 and shell mouse 14 can be any type of connection. For instance, button 20 on shell mouse 14 may have an associated electrical contact that signifies that it has been depressed. In that case, the signal connection from button 20 on shell mouse 14 to module mouse 12 is an electrical connection that simply indicates that button 20 has been depressed on shell mouse 14. That electrical connection, with its corresponding electrical signal, is electrically provided to a processing unit within module mouse 12 which can then take the desired action.

Similarly, the signal connections between module mouse 12 and shell mouse 14 need not be physical or electrical, but could be optical, acoustic, magnetic, etc. These are all contemplated.

In any case, in the embodiment shown in FIGS. 1A and 1B, the module mouse 12 is a fully functional, stand-alone mouse which provides significant advantages in terms of mobility and modularity. Shell mouse 14 can be added to extend the functionality of module mouse 10 at a desktop, for instance. As will be discussed below, the shell mouse 14 may also be extended to provide the typical outer conformation (outer periphery) of a mouse, thereby providing comfort by allowing use of the larger, or conventionally sized, mouse buttons, wheel, and other physical user input devices familiar to a typical user.

It will be understood that, in the embodiments shown in FIGS. 1A and 1B, module mouse 12 can be used with a shell mouse 14 having any desired physical conformation, so long as it provides the mechanical and signal connections to connect module mouse 12 therein. Therefore, in the embodiment in which shell mouse 14 has very few, if any, functions performed therein, it may be comprised of simply a plastic material. A wide variety of different shell mice 14 having different physical conformations, can thus be provided so that a user can pick and choose which shell mouse 14 to use with module mouse 12, at any given time. The shell mice 14 will be very inexpensive to manufacture, since none (or few) of the functional components of the mouse need to be redesigned, in any way.

Figure 2:
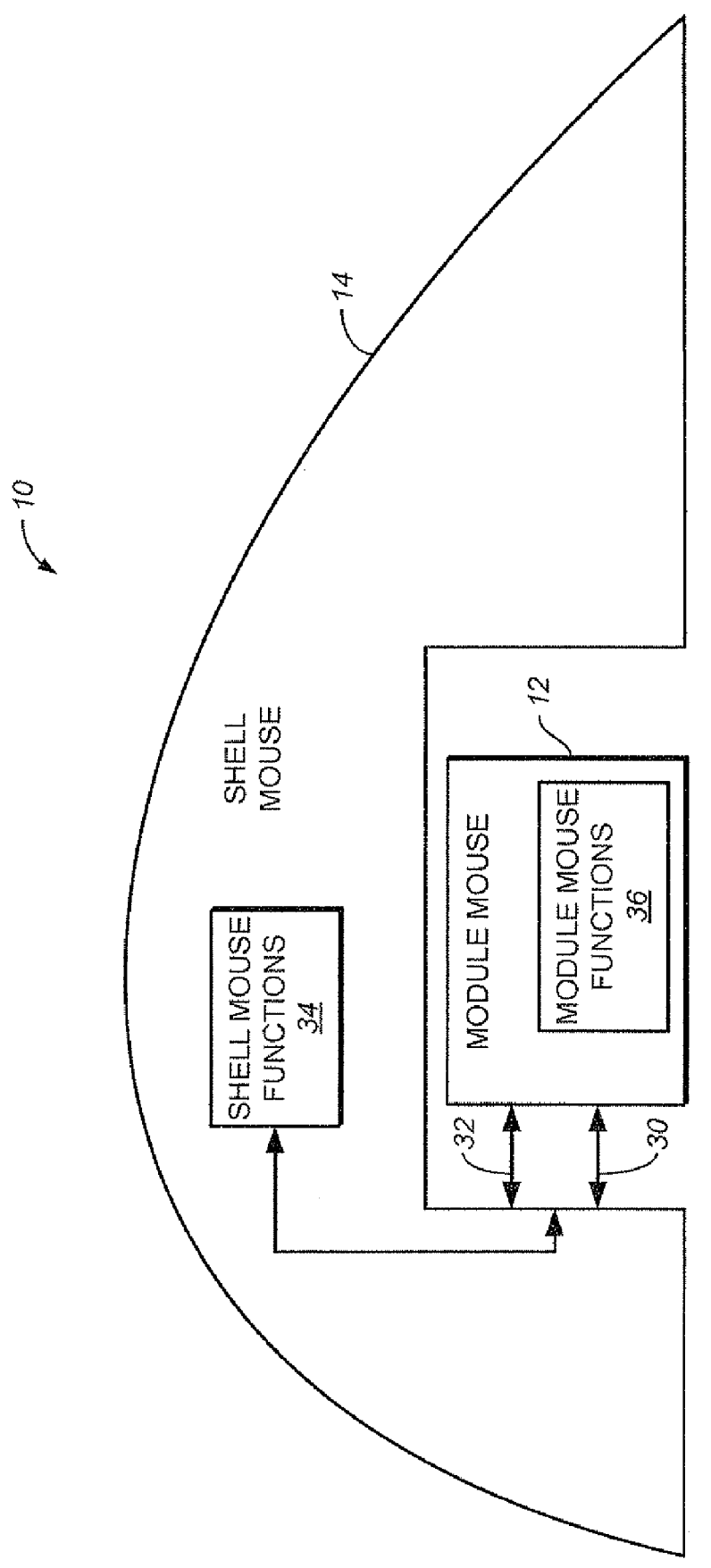
FIG. 2 is a schematic diagram of a shell mouse and module mouse, showing connections therebetween and a separation of functions, in accordance with one embodiment.

The embodiments shown in FIGS. 1A and 1B show module mouse 12 performing substantially all of the mouse functions, and shell mouse 14 performing substantially none of them (except perhaps to receive a user input of a button depression, scroll wheel, etc. and transfer that to a corresponding input on module mouse 12). However, the functions can be divided between module mouse 12 and shell mouse 14 in any desired way. FIG. 2 is a block diagram of another embodiment of mouse 10 in which the functions performed by the mouse are split between shell mouse 14 and module mouse 12. FIG. 2 shows that, as in the embodiment shown in FIGS. 1A-1B, module mouse 12 is connected to shell mouse 14 by both mechanical connections 30 and signal connections 32. As described with respect to the embodiments shown in FIGS. 1A and 1B, the mechanical connection 30 is simply any type of mechanical connection that allows module mouse 12 to be inserted within shell mouse 14 and mechanically docked therein. The signal connection 32, as described above with respect to the embodiment shown in FIGS. 1A and 1B, can take any desired form, such as physical, electric, optic, acoustic, magnetic, etc. and the particular signals provided over signal connection 32 will vary based upon how the mouse functions are split between module mouse 12 and shell mouse 14. It may be, for instance, that shell mouse 14 may include electrical switches and an electrical encoder for the wheel and perhaps batteries, electrically connectable to module mouse 12.

In any case, mouse 10 in FIG. 2 shows that the shell mouse 14 performs shell mouse functions 34, and module mouse 12 performs module mouse functions 36, All of the mouse functions, whether performed in shell mouse 14 or module mouse 12, are simply those conventional mouse functions (or new mouse functions) which are performed by a mouse under the influence of user inputs.

Figure 3:
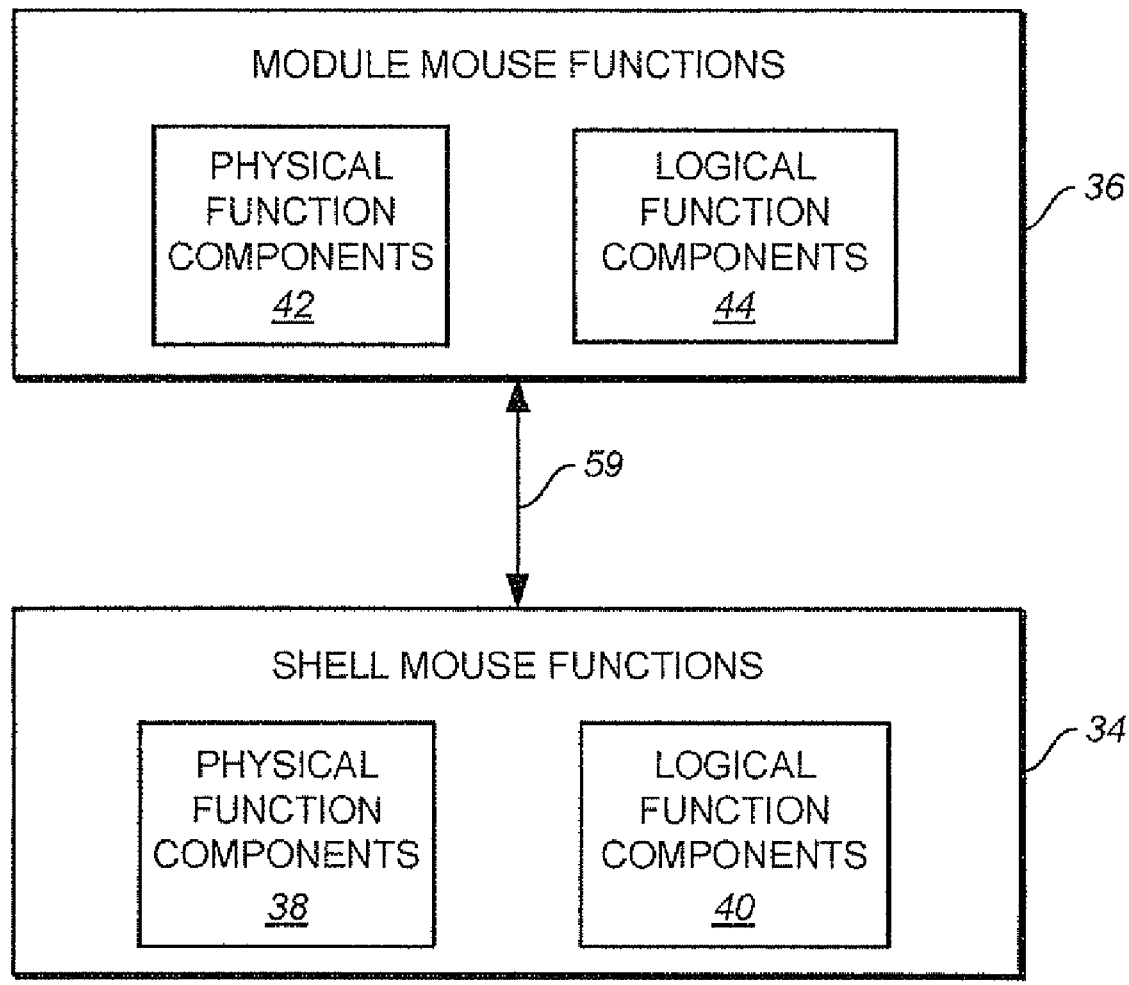
FIG. 3 is a block diagram illustrating mouse functions that can be performed by the module mouse and the shell mouse, in accordance with one embodiment.

FIG. 3 illustrates this in more detail. FIG. 3 is a block diagram showing shell mouse functions 34 and module mouse functions 36 in greater detail. Arrow 59 illustrates that the functions can be divided differently, or some functions can be performed using module mouse 12 and shell mouse 14, in which case such functions are shared functions. FIG. 3 shows that the functions can be divided among the module mouse 12 and shell mouse 14 either according to physical functions performed, or according to logical functions performed. In some cases, the components used to perform physical functions are the same as those used to perform logical functions, and referring to one of the functions as a physical function or a logical function, simply differs based on how the designer is thinking of those functions Examples of physical and logical functions are discussed below. One thing which should be noted, is simply that the functions performed by the mouse, whether they are thought of in terms of logical function or physical functions, can be divided, in any desired way, between module mouse 12 and shell mouse 14, and referring to a given function as either a physical function or a logical function is only done for the sake of clarity and to reflect that various mouse functions can be categorized and divided between the module mouse 12 and shell mouse 14, in any desired way. In any case, it can be seen that FIG. 3 shows that shell mouse functions 34 include both physical function components 38 and logical function components 40. Similarly, the module mouse functions 36 include physical function components 42 and logical function components 44.

The physical function components 38 and 42 are those components that allow a user to perform physical mouse functions. Such physical mouse functions include depressing a button, scrolling a wheel, rotating a ball, actuating a D-pad, etc. Therefore, the physical function components will illustratively be buttons, wheels, rollers, balls, etc. They are those components that allow a user to perform physical user interface functions with the mouse.

The logical function components 40 and 44 are illustratively those components that are used by the mouse in performing any necessary mouse functions. For instance, logical function components 40 and 44 might be the processing circuitry necessary for the mouse to provide output signals indicative of vertical scrolling, horizontal scrolling, cursor movement, navigation, etc.

Figure 4:
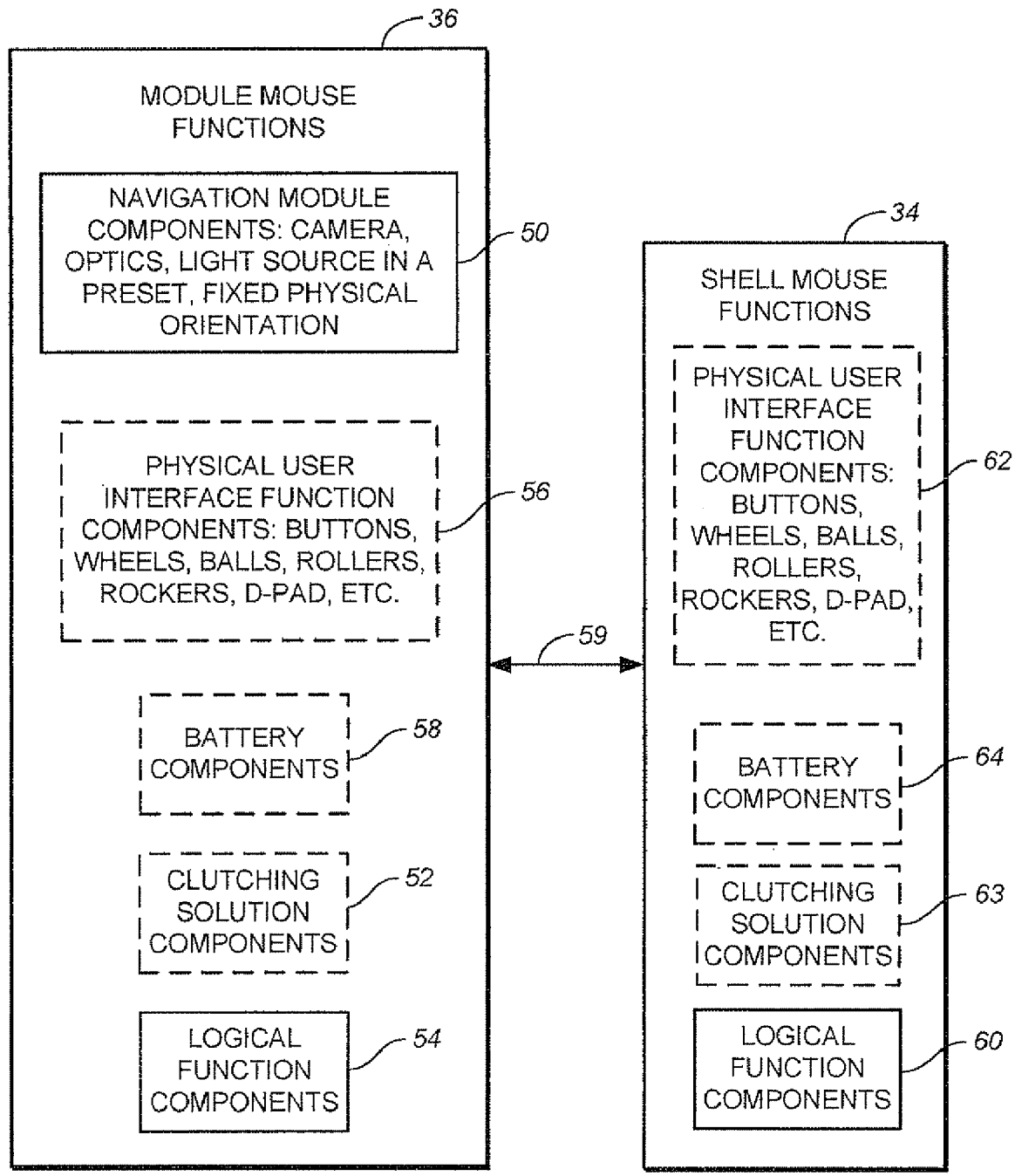
FIG. 4 illustrates one embodiment of the separation of mouse functions, in more detail, FIGS. 5A and 5B illustrative one embodiment of a module mouse.

FIG. 4 is a block diagram showing the module mouse functions 36 and shell mouse functions 34 in more detail. In the embodiment shown in FIG. 4, the functions shown in phantom can be performed on either mouse. Of course, the functions can be divided in any other way as well.

In any case, FIG. 4 shows that module mouse functions 36, which may illustratively be performed by module mouse 12, include navigation module components 50, clutching components 52 and logical function components 54. Module mouse functions 36 also show physical user interface function components 56 and battery components 58. Shell mouse functions 34, shown in FIG. 4, include logical function components 60, and physical user interface function component 62, as well as battery components 64.

In the embodiment shown in FIG. 4, the navigation module components 50 are contained on module mouse 12. Those components that are used for navigation illustratively include those provided to track movement of module mouse 12 across a work surface. This can be done using an one or more encoder wheels, or optically or in another way. The optical embodiment will be described herein for the sake of example only. Therefore, the navigation module components 50 illustratively include a camera, optics (such as lenses), and a light source, that are all fixed in a preset orientation relative to one another to form a module. This can be highly advantageous, because in prior mouse designs, where a new mouse is designed, the physical layout of the navigation module components (the camera, the optics, and the light source) must be re-engineered and retested with each new design. The physical tolerances must be determined, and quality assurance procedures may need to be adapted, each time a new mouse is designed. By providing module mouse 12 with the entire set of navigation module components already laid out in a preset, fixed, physical orientation relative to one another, regardless of the new physical mouse design, the navigation module components need not be re-laid out or retested. Instead, the new mouse design must simply be made so that it can receive the module mouse 12 (which has the assembled navigation module in it already) and all of the design time associated with the navigation module can be eliminated, even as the physical conformation of the mouse is changed.

FIG. 4 also shows that module mouse functions 36 include clutching solution components 52. Because a design goal for module mouse 12 might be absolute minimal size, in that case, module mouse 12 is illustratively very small, and it can be difficult for a user to grasp and pick up. When a user is repositioning a cursor on a computer display, it is not uncommon for a user to pick up and reposition the mouse relative to a work surface, without the mouse reflecting that movement with the cursor on the computer screen. However, because providing a module mouse 12 in a very small package renders it difficult to pick up, clutching solution components 52 are provided on module mouse 12, although clutching solutions 63 can be provided on shell mouse 14 instead of, or in addition to, those on module mouse 12.

The clutching solution components 52 can be components used to accomplish any desired solution to the problem of clutching such a small mouse. For instance, in one embodiment, clutching solution components 52 are simply embodied as a set of springs on the button surface of module mouse 12 (the work surface engaging portion of module mouse 12). When a user wishes to move module mouse 12 relative to the work surface, the user simply depresses the springs such that the work surface engaging portion of mouse 12 is closely proximate the work surface. The navigation module components 50 can then track movement of module mouse 12 relative to the work surface.

However, when the user discontinues depressing module mouse 12 toward the work surface, the springs lift module mouse 12 away from the work surface such that the navigation module components 50 no longer track movement of module mouse 12 relative to the work surface. In this way, the user need not pick up module mouse 12, but can simply allow the springs to lift it away from the work surface so that it can be repositioned by the user, In another embodiment, clutching solution components 52 include a mechanical slide, button, or other device that mechanically blocks the light from the light source in navigation module components 50 from reaching the work surface. Since no light from the light source is reaching the work surface, the movement of the mouse across the work surface will not be detected by navigation module components 50. The mechanically blocking device can be a slide actuable by the user either directly on the module mouse 12, or through shell mouse 14, as desired.

In yet another embodiment, clutching solution components 52 include electrically turning off the light source in navigation module components 50. This can be done in any desired way, such as by actuating a switch, a thumb switch, any other type of button, either on module mouse 12 or through shell mouse 14. Of course, other embodiments for clutching solution components 52 can be used as well.

Logical function components 54 are illustratively those components that are needed to perform logical functions for the mouse 10. For instance, different mice have a different number of features or functions that they can perform, usually based on the price of the mouse. Where module mouse 12 is used with lower end mice, then logical function components 54 may be relatively limited. Where module mouse 12 is used with higher end mice, then the logical function components 54 may include more features. Of course, module mouse 12 can be the same, and only desired features are enabled, depending on what level of mouse it is used with.

Some examples of logical functions 54 are the functions which are viewed on the user display, based on a mouse input. For instance, the module mouse 12 may provided for both vertical scrolling and horizontal scrolling. Alternatively, module mouse 12 may provide only vertical scrolling, in which case logical function components 54 will include the mechanical and processing components necessary to perform vertical scrolling.

FIG. 4 also shows that module mouse functions 36 include physical user interface function components 56. These can be any type of components that allow a user to physically interface with the mice, and perform mouse functions. Examples of such physical user interface function components include buttons, wheels, balls, rollers, rockers, a D-pad, etc. Where these components 56 are provided on module mouse 12, they can either be actuable by the user directly on module mouse 12, or through a corresponding component on shell mouse 14.

For instance, if module mouse 12 includes depressible buttons, shell mouse 14 can have an upper surface that has an opening therein that exposes those buttons on module mouse 12 to the user's hand. This allows the user to directly depress the buttons on module mouse 12.

Alternatively, the buttons on module mouse 12, for instance, can be depressed by depressing a corresponding button on shell mouse 14. For instance, shell mouse 14 may have a button (such as one of those shown with respect to FIGS. 1A and 1B) that has a physical plunger that is aligned with the corresponding button on module mouse 12, when module mouse 12 is mechanically docked within shell mouse 14. Therefore, when the user depresses the button on shell mouse 14, the button on module mouse 12 is physically depressed as well. Of course, the button depression on shell mouse 14 can be electrically detected using an electrical switch, acoustically detected, optically detected, etc., as desired. It should also be noted, of course, that the discussion with respect to the mouse button is exemplary only. The same types of functionality can be accomplished for the other user input components, mentioned above, with respect to the physical user interface function components 56.

FIG. 4 also shows that module mouse functions 36 include battery components 58. Module mouse 12, if it is a completely stand-alone mouse, may have its own battery or other power source. Alternatively, of course, the power source function can be deployed in shell mouse 14. In that case, shell mouse 14 includes a battery which powers the components of module mouse 12, when module mouse 12 is physically docked in shell mouse 14 and when the signal connections are made with shell mouse 14 as well. Alternatively, both module mouse 12 and shell mouse 14 can have battery components (58 and 64 shown in FIG. 4). In that case, the battery components on the shell mouse 14 can be connected in parallel with the battery components on the module mouse 12 to extend battery life in another alternative, the power consumption of module mouse 12 can be terminated or postponed while the shell mouse 14 is connected, thus preserving the standalone life of the smaller module mouse 12. Therefore, the battery components 52, 64 can be located on either module mouse 12 or shell mouse 14, or on both.

In the embodiment in which both mice have a battery, a charge protection circuit will illustratively be incorporated which prevents the mouse batteries in module mouse 12 from draining current into the batteries in shell mouse 14 in the case where the module mouse 12 has batteries with a higher voltage. Similarly, where shell mouse 14 includes a user interface function component that is also included on module mouse 12, the component on module mouse 12 can be disabled when module mouse 12 is docked in shell mouse 14. For instance, where both mice include an encoder wheel, when module mouse 12 is docked within shell mouse 14, a switch (or other circuit) could disable the encoder wheel on module mouse 12.

Although the various mouse functions have been described in context of module mouse functions 36, similar functions are shown on shell mouse functions 34. The functions on shell mouse 14 can be the same or different functions as those described on module mouse functions 36 depending on how the mouse functions are divided between module mouse 12 and shell mouse 14.

Figure 5A:
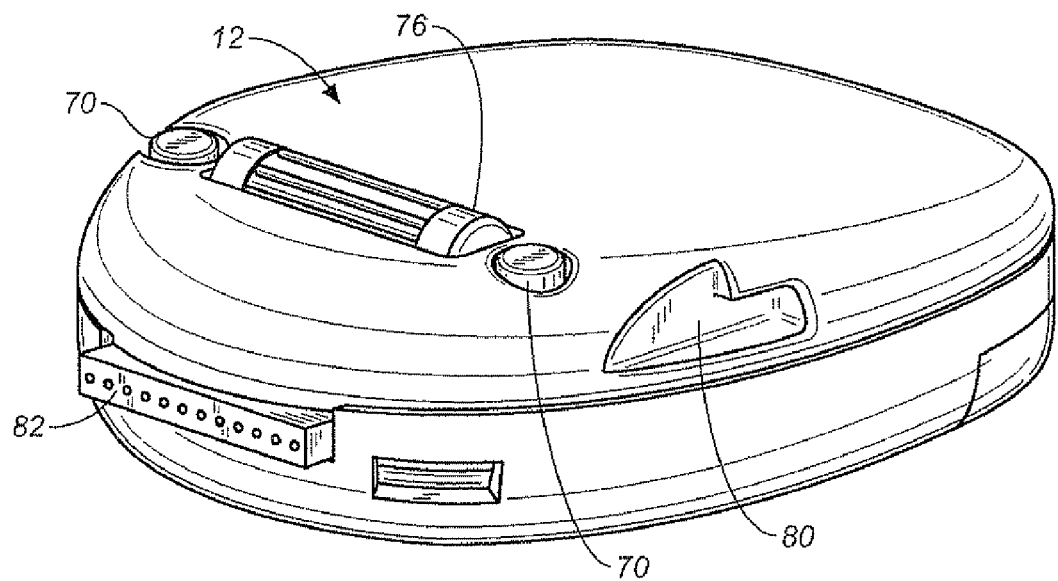
Figure 5B:
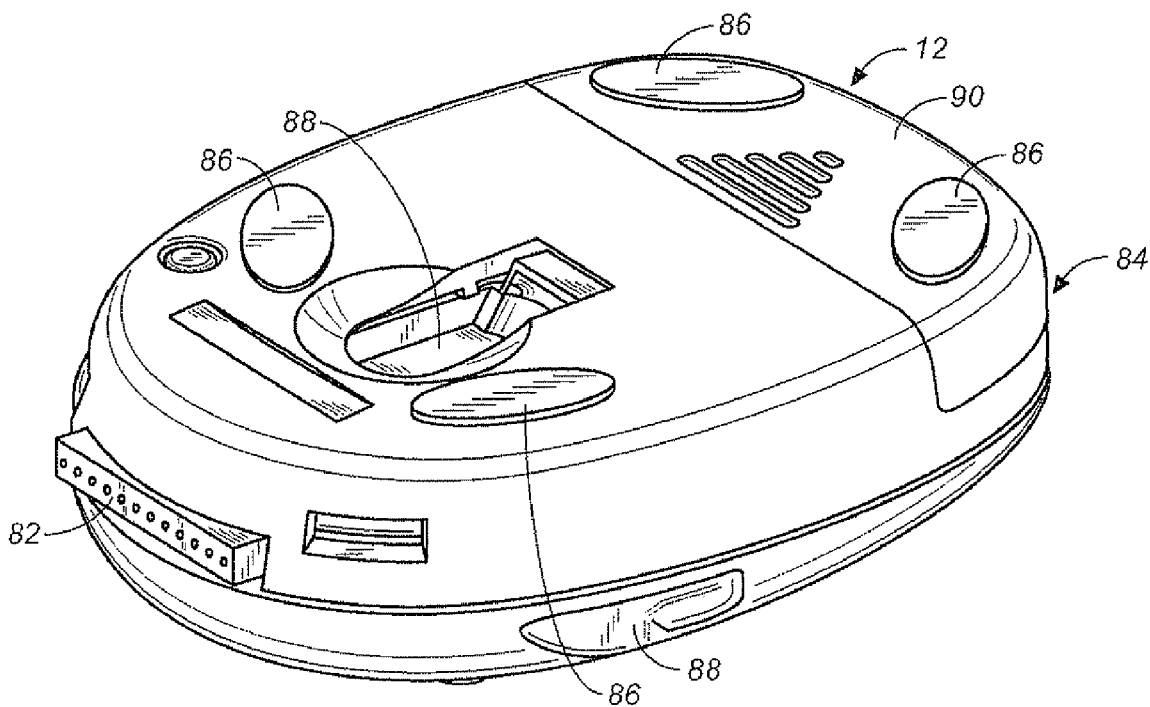

It will thus be appreciated that mouse 10 can be built such that module mouse 12 contains the navigation module components 50 and any other desired components that perform mouse functions. Shell mouse 14 can include any desired shell mouse functions 34, and the mouse 10 will illustratively include a combination of the functions, such as a subset, a superset, or an equal set, of the mouse functions implemented on either or both of module mouse 12 and shell mouse 14. For instance, shell mouse 14 may not enable all of the functions on module mouse 12, or it could provide exactly the same functions or even unique functions that the module mouse 12 can control but not perform by itself FIGS. 5A and 5B show an illustration of the top, and bottom, respectively, of one illustrative module mouse 12. FIGS. 5A and 5B show that, in the embodiment illustrated, module mouse 12 has a first set of physical user interface function components that can be used by a user to perform mouse functions using mouse 12. For instance, mouse 12 includes a pair of mouse buttons 70, both of which can be depressed by a user. Mouse 12 also includes a wheel 72 that can be rotated by the user. In the embodiment illustrated, wheel 72 also incorporates integrated buttons so that each end 74 and 76 of wheel 72 can be depressed, thus, actuating buttons disposed thereunder. Of course, these physical user interface function components are exemplary only, and a wide variety of different components, or additional components could be used as well.

FIG. 5A also shows that the mechanical connection 30 (diagrammatically shown in FIG. 2) is implemented using a pair of guide slots 80 disposed on the outer periphery of mouse 12. The guide slots on mouse 12 illustratively cooperate, in mating relationship with, guides on shell 14. Therefore, when module mouse 12 is inserted within the opening in shell mouse 14, guide slots 80 engage corresponding guides such that mouse 12 can be slid forward (as shown above with respect to FIG. 1B) to mate with guides and thereby dock (mechanically secure) mouse 12 within shell mouse 14.

FIGS. 5A and 5B also show that the signal connection 32 is illustratively made by an electromechanical interface connector 82. Connector 82 illustratively includes a plurality of holes that mate with a plurality of pins within the interior of shell mouse 14. Of course, the guide slots 80 that form the mechanical connection, and the connector 82, that forms the signal connection, are illustrative only. A wide variety of other mechanical and signal connection mechanisms could be used as well, and those shown in FIGS. 5A and SB are given for the sake of example.

FIG. 5B shows that not only does mouse 12 illustratively include an exterior case 84, but it illustratively has a plurality of sliding pads 86 on the bottom thereof. Pads 86 allow module mouse 12 to be easily slid along a work surface when it is used in a stand-alone fashion.

FIG. 5B also shows that the case 84 of mouse 12 illustratively defines an aperture 88 through which the navigation module components can act to detect movement of module mouse 12 relative to the work surface over which it is moving. Case 84 is also shown having a removable battery cover 90. In the embodiment in which module mouse 12 includes a battery, it can be easily accessed by removing battery cover 90 in a known way. Alternatively, the batteries are rechargeable and need not be user removable.

In another embodiment, the navigation may operate through a transparent window, or a window which appears opaque to the user but is transparent to the navigation system. A wide variety of other embodiments are also contemplated.

Figure 6A:
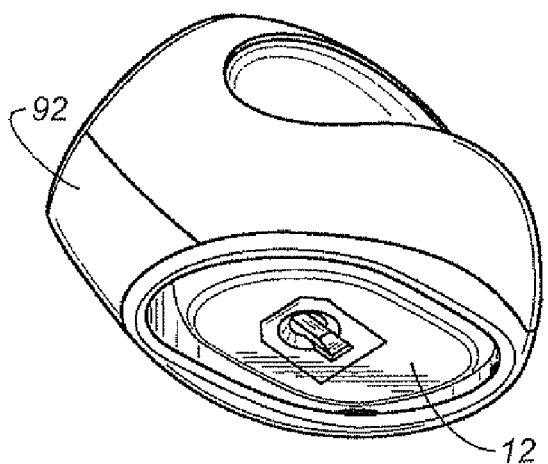
FIGS. 6A-6C illustrate the module mouse shown in FIGS. 5A and 5B with different embodiments of a shell mouse.
Figure 6B:
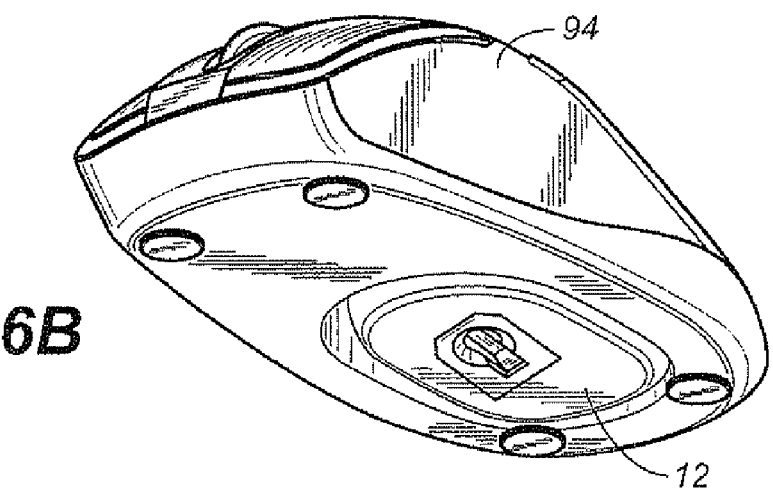
Figure 6C:
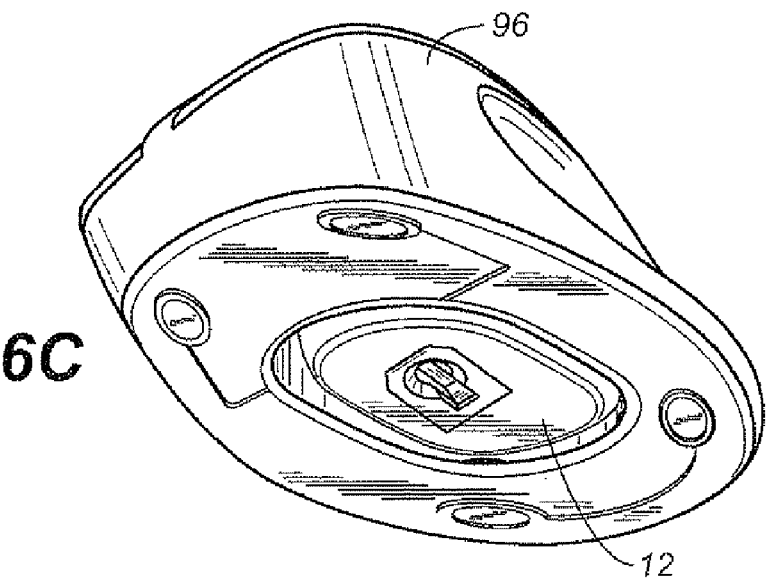

FIGS. 6A-6C show module mouse 12 disposed within three different shell mice 92, 94, and 96, respectively. It is worth noting that module mouse 12, in the embodiment shown in FIGS. 6A-6C, is identical in each case. It can be used with many different overall mouse designs delineated by the various shell mice 92-96 with which module mouse 12 is used. Because, in the embodiment shown in FIGS. 6A-6C, shell mice 92-96 are made substantially only of plastic, they are extremely inexpensive. Their design is completely open to the designer, except that the shell mice 92-96 must each have an aperture through which the navigation system can detect the tracking surface and connection mechanisms sized and configured to receive and dock with module mouse 12. As stated earlier, the window might be transparent or opaque to a user, so long as the navigation system can detect the tracking surface through it. For instance, some plastic is dark to wavelengths visible by a user but transparent to infrared wavelengths. Other than that, the design of the shell mice 92-96 is completely open to the imagination of the designer.

Where the designer wishes the shell mice 92-96 to have physical user interface function components (such as buttons, wheels, etc.) then either the shell mice 92-96 must have the components necessary to support those functions (such as detectors that detect when the buttons are depressed and when the wheels are rotated, etc.) so corresponding signals can be sent to module mouse 12, or it must have some type of mechanism by which the physical user interface function components on the shell mice 92-96 actuate corresponding physical user interface function components on module mouse 12. In other words, where shell mouse 94 has a scroll wheel, rotation of that scroll wheel must either be detected by shell mouse 94, or the scroll wheel must be connected to a corresponding scroll wheel on mouse 12, such that when a user rotates the wheel on shell mouse 94, the wheel on module mouse 12 is correspondingly rotated. This can be accomplished, of course, in any of a wide variety of different ways, such as by using a mechanical drive train that connects the two wheels, or by using any other type of electrical, optical, acoustic, magnetic, capacitive, inductive, resistive or physical connection, or any other connection mechanism. In another embodiment, capacitive touch sensors can be used instead of a wheel on the shell mouse 14 or module mouse 12.

The user interface function components on the shell mouse can be used in a variety of different ways. For instance, when referring to buttons, the buttons can activate typical switches in the shell mouse 14 which are electrically connected to module mouse 12. Alternatively, the buttons can mechanically activate switches within, or disposed on module mouse 12. Similarly, the buttons can mechanically interrupt or allow optical light to pass, wherein the light source is initiated by module mouse 12. The buttons can magnetically activate sensors in the module mouse 12 for use as switches. The buttons can acoustically activate microphones in module mouse 12, or the buttons can activate elastomeric dome switches electrically wired to module mouse 12. These are but a few of the examples in which user interface function components on shell mouse 14 can interface with, or provide signals to, module mouse 12. Of course, capacitive or resistive touch sensors can also be employed to act as, or enhance, switches.

It will also be noted that, in the embodiment shown in FIGS. 6A-6C, module mouse 12 is easily disconnectable by the end user. The end user simply needs to reverse the process of inserting module mouse 12 within the shell mouse 92-96. Thus, a user can easily try different shell mice and can change shell mice based on the application, ergonomics, or user preference. Because the plurality of different shell mice 92-96 can be very inexpensively manufactured, it is believed that a wide variety of shell mice may be available to users of module mouse 12.

Figure 7A:
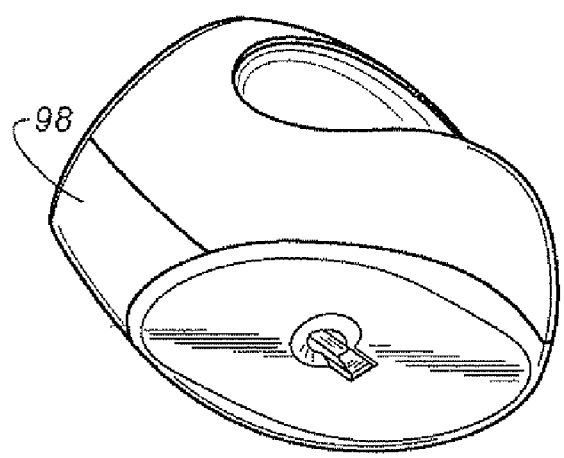
FIGS. 7A-7C illustrate a module mouse fixedly assembled within three different embodiments of shell mice.
Figure 7B:
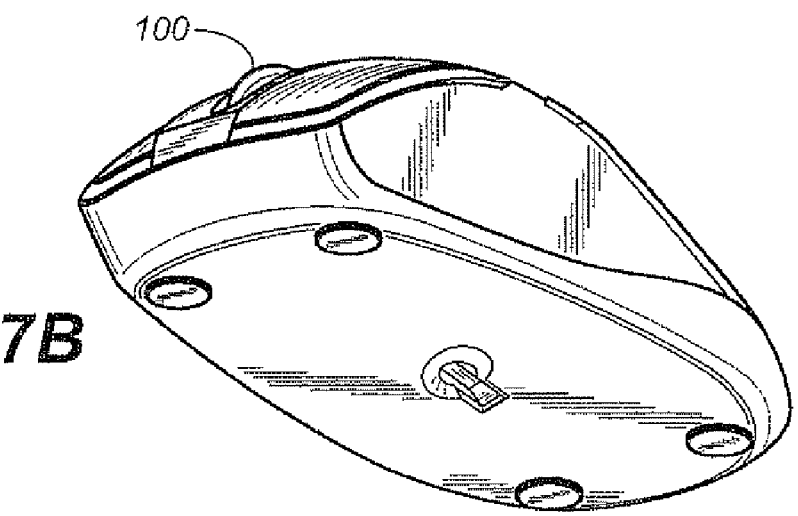
Figure 7C:
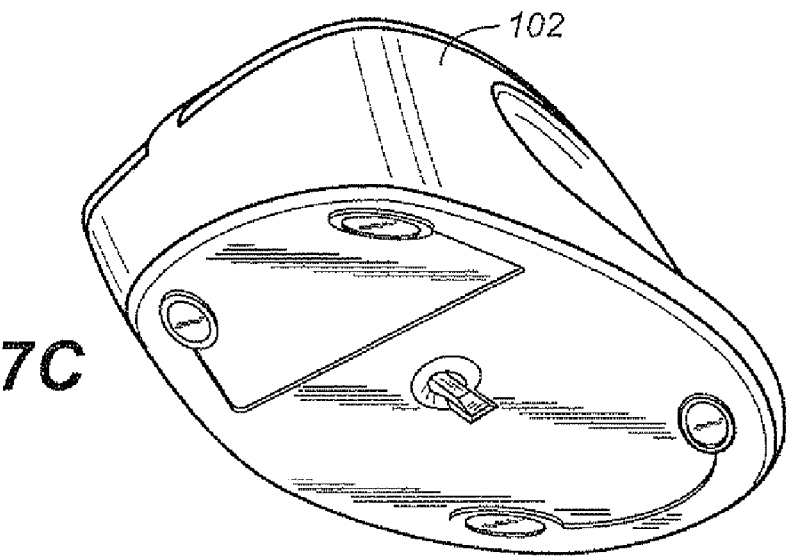

FIGS. 7A-7C illustrate yet another embodiment in which a module mouse can be used with shell mice. In the embodiment shown in FIGS. 7A-7C, only the optical port of module mouse 12 is visible. Of course, as described above, the optical port may not be visible to a user, but only needs to be configured such that the navigation system can detect the tracking surface. Shell mice 98, 100 and 102 are similar to shell mice 92-96 shown in FIGS. 6A-6C except that module mouse 12 is no longer removable by the user. This provides even more flexibility to the mouse designer the entire mouse exterior surface of mice 98-102, including the bottom case (or base surface) of mice 98-102, can be custom designed into any desired shape. However, because mice 98-102 include module mouse 12 therein, and because module mouse 12 is identical, regardless of the exterior conformation of mice 98-102, the functional components of mice 98-102 which are performed by module mouse 12 need not be redesigned, retested, and re-specified (such as specifying assembly tolerances, signal levels, etc.). Instead, this has already been done for module mouse 12 and thus incorporating module mouse 12 into mice 98-102 drastically increase development efficiencies of new mouse designs.

It can thus be seen that the present system can segment the complexity and cost of mouse design between the functional parts of the mouse and the physical design elements of the mouse. This enables the physical design elements of the mouse to be changed with a great deal of frequency, without undertaking a complete redesign of the entire functional portion of the mouse.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer mouse for use on a work surface and configured to perform mouse functions, the computer mouse comprising:
   a mouse module having at least a first set of logical mouse function components configured to perform a first set of logical mouse functions in the mouse module; and
   a shell configured to mechanically receive the mouse module therein and having an overall outer periphery on a work surface engaging side that is different from the outer periphery of the mouse module, wherein the mouse module is configured to perform the first set of logical mouse functions independently of the shell, and wherein the shell includes a second set of logical mouse function components configured to perform at least one second logical mouse function that is different than the first set of logical mouse functions such that the mouse functions performed by the computer mouse comprise at least a combination of the first set of logical mouse functions and the at least one second logical mouse function.

2. The computer mouse of claim 1 wherein the shell is configured to disconnectably receive the mouse module therein such that the mouse module can be removed from the shell by a user.

3. The computer mouse of claim 1 wherein the first set of mouse function components comprises:
   a navigation module having navigation module components arranged in a preset, fixed physical orientation relative to one another.

4. The computer mouse of claim 3 wherein the navigation module components include a light source, a lens and a detector.

5. The computer mouse of claim 1 wherein the first set of mouse function components comprises a battery.

6. The computer mouse of claim 5 wherein the second set of mouse function components also comprises a battery configured to be electrically connected to at least partially power the first set of mouse function components when the mouse module is received within the shell.

7. The computer mouse of claim 1 wherein the first set of mouse function components comprises:
   first physical user interface function components.

8. The computer mouse of claim 7 wherein the second set of mouse function components comprises:
   second physical user interface function components.

9. The computer mouse of claim 8 wherein the first and second physical user interface function components interact with one another to perform a mouse function.

10. The computer mouse of claim 1 wherein the mouse module is connected to the shell with a signal connection that communicates function signals between the shell and the mouse module.

11. The computer mouse of claim 1 wherein the mouse module comprises a stand-alone computer mouse.

12. The computer mouse of claim 11 wherein the mouse module is configured to be received within any one of a plurality of different shells, each shell having a different exterior physical conformation from other shells in the plurality of different shells.

13. A computer mouse assembly configured to perform a plurality of mouse functions, the assembly comprising:

a computer mouse having a first set of mouse function components configured to perform a first set of mouse functions, wherein the first set of mouse function components comprises a first battery; and a shape retaining shell having an opening disposed to connectably receive the computer mouse therein, the shell including a second set of mouse function components configured to perform at least one mouse function, wherein the second set of mouse function components comprises a second battery configured to be electrically connected to at least partially power the first set of mouse function components when the computer mouse is received within the opening of the shape retaining shell.

14. The computer mouse assembly of claim 13 wherein the computer mouse has a navigation module configured to detect movement of a base of the computer mouse relative to a work surface and wherein the base of the computer mouse has an exterior periphery that is different from the exterior periphery of a base of the shell.

15. The computer mouse assembly of claim 13 wherein the at least one set of mouse function components on the shell includes a set of physical user interface components that cooperate with physical user interface components on the computer mouse to perform a physical user interface mouse function.

16. A computer mouse, comprising:
a mouse module including a navigation module having navigation components mounted in a fixed physical orientation relative to one another and being configured to detect movement of the navigation module relative to a work surface, the mouse module including one or more clutching solutions components configured to selectively modify operation of the navigation module based on a status of the mouse module detected by the one or more clutching solutions components; and a mouse shell, separate from, but configured to be disconnectably connected to, the mouse module such that the navigation module detects movement of the mouse shell relative to the work surface.

17. The computer mouse of claim 16 wherein the mouse shell comprises a set of mouse function components for performing a mouse function, wherein the set of mouse function components on the mouse shell includes at least one of physical user interface function components and a battery.

18. The computer mouse of claim 16, wherein the one or more clutching solutions components are configured to disable movement detection of the navigation components based on the status of the mouse module.

19. The computer mouse of claim 18, wherein the one or more clutching solutions components are configured to disable movement detection of the navigation components without the mouse module being disengaged from the work surface.

20. The computer mouse of claim 19, wherein the one or more clutching solutions components comprises one or more of a set of springs configured to lift the mouse module away from the work surface, a feature configured to block light emitted from a light source of the navigation module, and a switch configured to disabled the light source.

* * * * *